United States Patent
Wade et al.

(10) Patent No.: US 9,052,246 B2
(45) Date of Patent: Jun. 9, 2015

(54) FORCE SENSOR USING INTEGRAL FORCE BIASING FOR IMPROVED LINEARITY

(71) Applicant: Honeywell International Inc., Morristown, NJ (US)

(72) Inventors: Richard Wade, Worthington, OH (US); Ian Bentley, New Ipswich, NH (US); Jason Dennis Patch, Columbus, OH (US); Lamar Floyd Ricks, Lewis Center, OH (US)

(73) Assignee: Honeywell International Inc., Morristown, NJ (US)

( * ) Notice: Subject to any disclaimer, the term of this patent is extended or adjusted under 35 U.S.C. 154(b) by 96 days.

(21) Appl. No.: 14/080,545

(22) Filed: Nov. 14, 2013

(65) Prior Publication Data

US 2015/0128729 A1     May 14, 2015

(51) Int. Cl.
 *G01L 1/04*   (2006.01)
 *G01L 1/18*   (2006.01)
 *G01L 9/00*   (2006.01)
 *G01L 19/14*  (2006.01)

(52) U.S. Cl.
 CPC ............... *G01L 1/18* (2013.01); *G01L 19/147* (2013.01); *G01L 9/0052* (2013.01)

(58) Field of Classification Search
 CPC ....... G01L 1/18; G01L 9/0052; G01L 19/147; G06F 3/0414

USPC ............... 73/760, 862.391, 862.632
 See application file for complete search history.

(56) References Cited

U.S. PATENT DOCUMENTS

| | | | |
|---|---|---|---|
| 5,060,520 A * | 10/1991 | Strasser | 73/715 |
| 5,483,842 A | 1/1996 | Foreman | |
| 9,003,897 B2 * | 4/2015 | Wade et al. | 73/862.623 |
| 9,003,899 B2 * | 4/2015 | Wade | 73/862.632 |
| 2008/0203712 A1* | 8/2008 | Hawes et al. | 280/735 |
| 2013/0247690 A1 | 9/2013 | Wade | |

* cited by examiner

*Primary Examiner* — Max Noori
(74) *Attorney, Agent, or Firm* — Craige Thompson; Thompson Patent Law

(57) ABSTRACT

Apparatus and associated methods relate to a preloaded force sensor, the preloaded force being greater than a force threshold separating a non-linear response region of sensor operation from a substantially linear response region of sensor operation. In an illustrative embodiment, the total applied force includes the preloaded force and an externally-applied force, the preloaded force being predetermined such that electrical signal response is substantially linear for positive externally-applied forces which when added to the preload force do not exceed the maximum force. In some embodiments, the externally-applied force may be transferred to a force-sensing die via a force-transfer member. In an exemplary embodiment, a spring having a predetermined spring coefficient may apply the predetermined preload force to the force-transfer member. In an exemplary embodiment, externally-applied positive forces may be simply calibrated using gain and offset corrections.

20 Claims, 8 Drawing Sheets

FORCE SENSOR USING INTEGRAL FORCE BIASING FOR IMPROVED LINEARITY

CROSS-REFERENCE TO RELATED APPLICATIONS

This application fully incorporates, by reference herein, the disclosures of the following previously submitted applications, which have related subject matter and common inventorship:
Ser. No. 13/429,280 Force Sensor Mar. 23, 2012
Ser. No. 13/628,673 Mechanically Coupled Force Sensor on Flexible Platform Assembly Structure Sep. 27, 2012

TECHNICAL FIELD

Various embodiments relate generally to force sensors, and more specifically to force sensor with linearity correcting methods.

BACKGROUND

Force sensors are widely used in the many arenas of today's high-technology world. Force sensors are used in advanced robotics to provide an electrical signal in response to a force. Such robots may use force sensors to provide feedback to a processor as to a force applied by a moving mechanism under robot control. But force sensors may also be used to provide feedback to a processor as to a force applied externally to a robot. For example, if a member of a robot is moved, it may bump an external object. A force sensor may be used to provide a robot with an anthropomorphic sense of touch, for example.

Force sensors are also used in many medical devices as well. In many applications, force sensors are used to measure the pressure of a fluid. For example, two force sensors may be positioned on either side of a restriction in compliant tubing. When fluid flows through the compliant tubing, the pressure of the fluid creates a force on the tubing which the force sensor can detect when in contact with the tubing. When a liquid is flowing through the tube, a pressure differential may result from the restriction between the two force sensors. This pressure differential may result in the downstream sensor reporting a smaller force than with no flow within the compliant tubing. The difference between the measured force of the upstream and the downstream force sensors may signify the flow rate of the fluid within the compliant tubing. Forces sensors may be used to measure the amount of medication administered to a patient from an IV bag, and the blood volume cleansed by a dialysis machine, for examples.

SUMMARY

Apparatus and associated methods relate to a preloaded force sensor, the preloaded force being greater than a force threshold separating a non-linear response region of sensor operation from a substantially linear response region of sensor operation. In an illustrative embodiment, the total applied force includes the preloaded force and an externally-applied force, the preloaded force being predetermined such that electrical signal response is substantially linear for positive externally-applied forces which when added to the preload force do not exceed the maximum force. In some embodiments, the externally-applied force may be transferred to a force-sensing die via a force-transfer member. In an exemplary embodiment, a spring having a predetermined spring coefficient may apply the predetermined preload force to the force-transfer member. In an exemplary embodiment, externally-applied positive forces may be simply calibrated using gain and offset corrections.

Various embodiments may achieve one or more advantages. For example, some embodiments may advantageously improve the accuracy of measurement of forces. Such accuracy improvement may improve medical care, such as for example delivering precise dosages of medications. Some embodiments may increase the dynamic range of measurements of a force sensor. Some embodiments may simplify the calibration of manufactured force-sensing devices. In an exemplary embodiment, calibration may be accurately performed using but two measurements, a low-force and a high-force measurement. In some embodiments, the low-force measurement may be a zero-force measurement. In such an embodiment, a single calibrated non-zero measurement may provide for a well-calibrated sensor. Requiring but a single non-zero measurement may permit a single National Institute of Standards and Technology (NIST) traceable forcing measure. In some embodiments, a preloaded force sensor may improve the precision of low force measurements. Measurement repeatability may be improved using force biasing of force sensors. The uniformity of the performance of finished sensors may be advantageously improved in many embodiments.

In an illustrative embodiment, force-biased sensors may be specified with higher accuracies. These highly accurate sensors may find new applications which require such performance. For example, for use in applications that require precise dosages of medicines, preloaded force sensors may be used, where they may have been insufficiently accurate without the preloaded force. In some embodiments, the precision of the force sensors may be improved especially for small externally-applied forces. This improvement may facilitate their use for wider dynamic-range applications. For example, wide-dynamic-range sensors may be used for both adult dosing measurements and child dosing measurements. In some embodiments the usable dynamic range of a sensor may be maximized by a precise predetermination of a preloading force value. A maximized dynamic range may in turn provide for a maximum overforce value of these exemplary force sensors. In some embodiments, a preloaded force sensor may be specified to safely measure forces of higher maximum values.

In some embodiments, coupling an outside system to the sensor may result in an accurate zero reference. In an exemplary application, an infusion pump tubing may be coupled to an exemplary pre-loaded force sensor with very low force. The pre-loaded force sensor may have good linearity at low force values. Such sensors may be able to determine whether an IV bag is full or empty even with the door open and not exerting additional pressure on the force sensor.

In an exemplary embodiment, the temperature coefficient of the measurement may be improved by using a preloading member having a predetermined temperature coefficient of force. In some embodiments, a temperature coefficient of measurement may be made to be repeatable. In some embodiments, the temperature coefficient of measurement may be deterministic. In an exemplary embodiment, the temperature coefficient of measurement may be made small. In some embodiments, the temperature coefficient of measurement may be approximately zero.

In some embodiments, an ability to measure the pressure of the fluid in the tubing may allow force sensors to provide feedback to medical pump systems of the fluid pressure. This ability to measure fluid pressures may enable proper delivery of medications and to improve patient comfort. In some embodiments, by measuring the fluid without contacting it, the sterility of the fluid may be uncompromised. Such contactless measurement may provide a solution which may be economically reused.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, with reference to FIGS. 1A-1C, an exemplary application of a force sensor used in a medical setting is briefly described to introduce some of the benefits of a force-biased force sensor. Second, with reference to FIGS. 2-3, exemplary preloaded force sensors having force-transfer devices that include a gel transfer member will be described. Then, with reference to FIGS. 4-5, discussion turns to exemplary force biasing using mechanical force-transfer members. Finally, with reference to FIGS. 6-7, exemplary performance improvements will be discussed using response plots and error plots depicting non-preloaded measurement results. From these plots, performance improvements will be described, the improvements resulting from preloading the sensor used in obtaining the measurements.

Figure 1A:
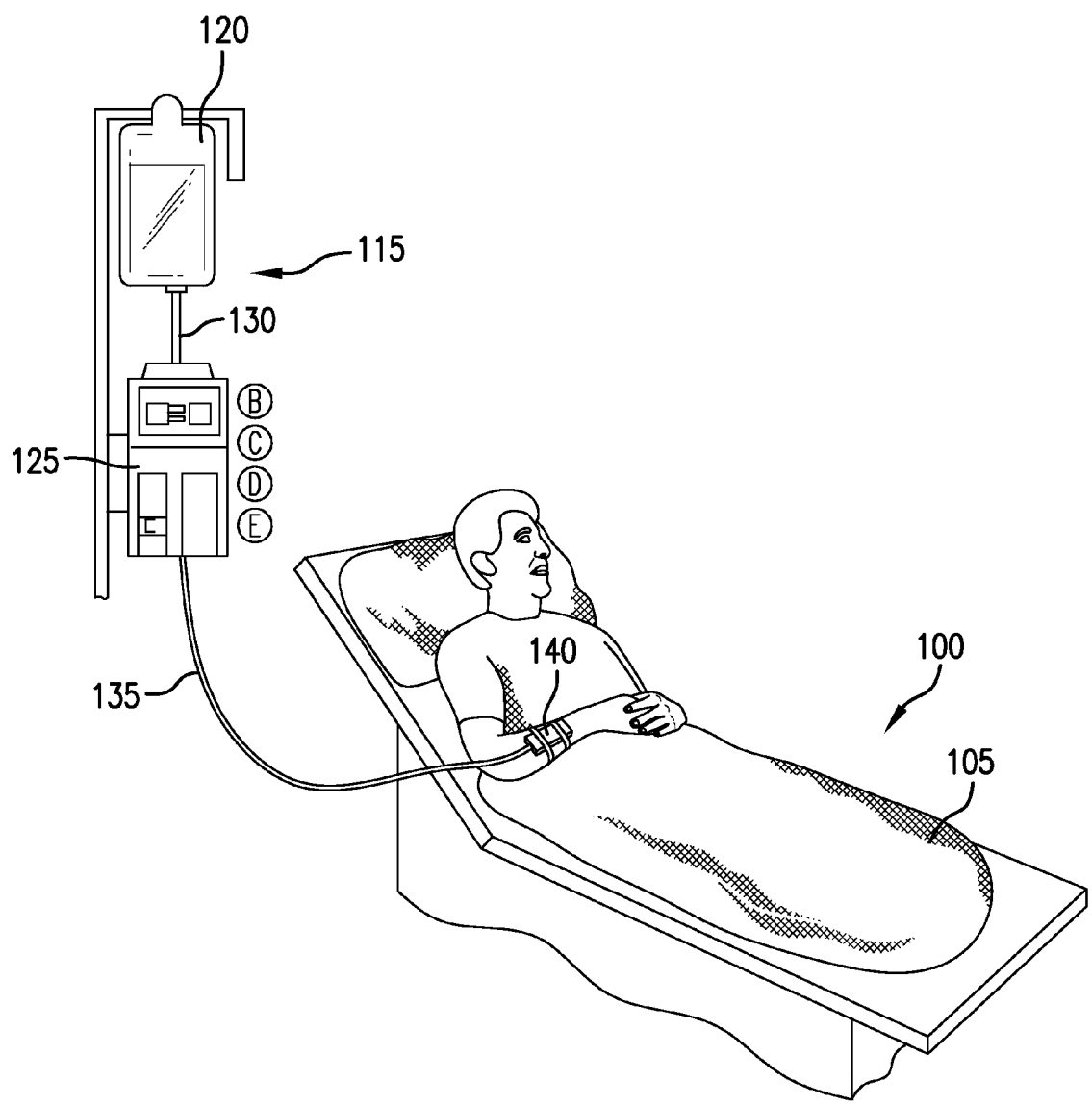
FIGS. 1A-1B depict an exemplary scenario in which a force sensor is used to monitor the flow of medication into a patient.
Figure 1B:
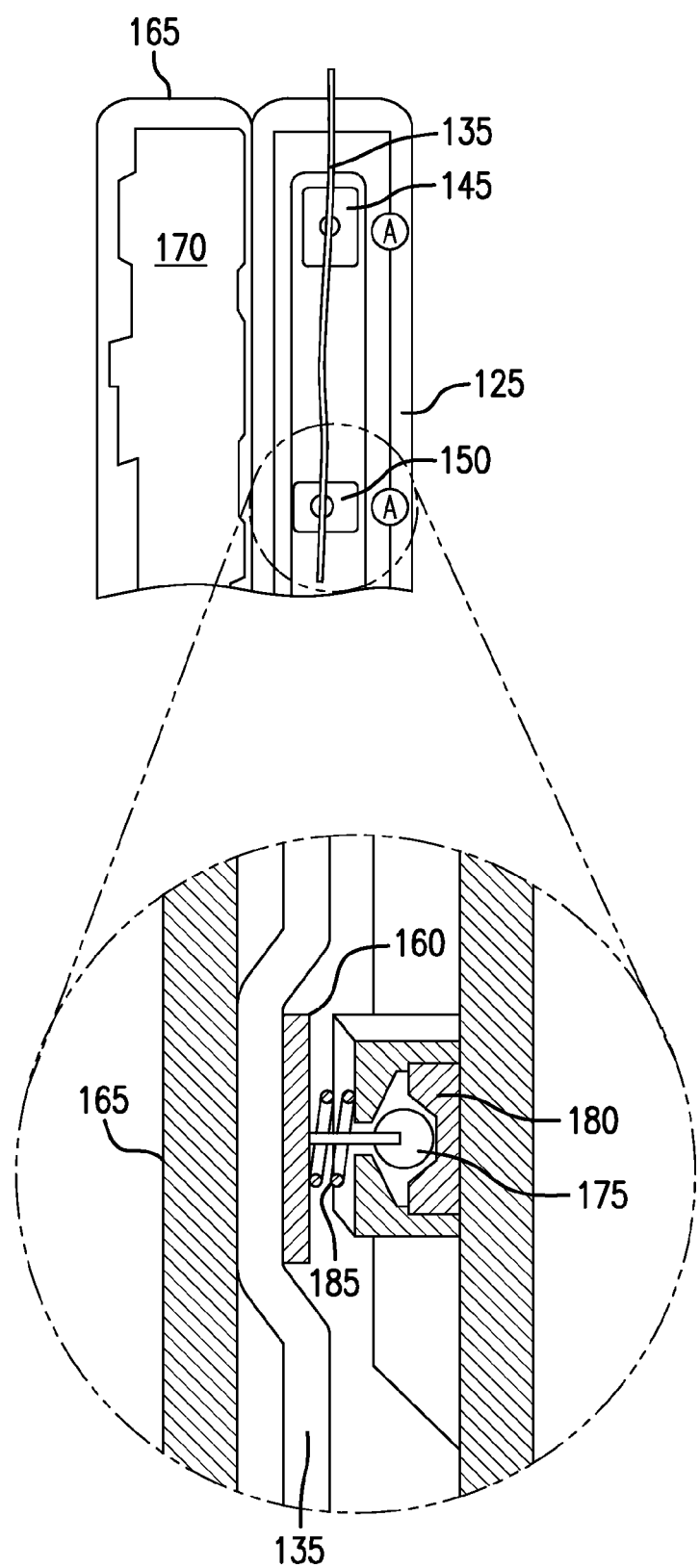

FIGS. 1A-1B depict an exemplary scenario in which a force sensor is used to monitor the flow of medication into a patient. In FIG. 1A, a hospital setting 100 includes a gurney 105 upon which a patient 110 lies. Next to the gurney 105 is an Intra-Venus (IV) apparatus 115. The IV apparatus 115 has a medicine bag 120 connected to an infusion pump 125 via a tubing 130. A delivery tubing 135 may carry the medicine from the infusion pump 125 to the patient 110, and may deliver the medicine to the patient 110 via an intravenous connection 140. The infusion pump 125 may calculate the flow of medication by using two force sensors 145, 150, for example. A small difference between the measurements of the upstream force sensor 145 and the downstream force sensor 150 may indicate a flow rate of the medicine, for example. To make an accurate measurement, a pressure within the tubing 135 may be transferred to the sensing die using a force-transfer member 155. In the depicted embodiment, the tubing 135 may be pressed toward a plunger 160 by a closing a door 165 making an inside surface 170 of the door press the tubing 135 into the plunger 160. An initial measurement from each force sensor 145, 150 may establish a zero-flow starting force measurement. Then the infusion pump 125 may be turned on. The plunger 160 may then couple the force to a ball 175 situated above a force-sensing die 180. A stretched spring 185 may provide an additional tensile force pulling the plunger 160 into the ball 175 which then presses into the force-sensing die 180. Even with little pressure within the tubing 135, the spring action imparts a positive force to the force-sensing die 180. This total force from the spring 185 added to the pressure of the tubing 135 may be incident upon the force-sensing die 180. For force-sensing dies 180 that may have marginal performance when small forces are incident, the spring 185 loading may improve the precision of the measurements for small externally-applied forces.

The spring, in this case under a tensile force, may ensure that no internal slack exists in the mechanical coupling of the sensor. If the mechanical chain is loose, some of the applied force goes to displacement and friction and is lost to the force measurement die. Non-linear measurement behavior may result if the mechanical chain is loose.

In some embodiments, the infusion pump 125 may precisely measure a flow of the medicine to the patient 110. The infusion pump 125 may calculate the remaining medicine in the medicine bag 120 by integrating the flow from the time the medicine bag 120 was initially hung onto the IV apparatus 115. A precise calculation of the remaining medicine may enable the infusion pump 125 to signal when the medicine bag 120 needs changing, for example. In some embodiments, a precise flow of medicine may provide safe delivery of medicine to the patient 110, for example. In some embodiments, the tubing 135 may be coupled to the plunger 160 using a variety of means. The sensing die 180 may provide an electrical signal representative of the force applied. The electrical signal may have a substantially linear response region for forces that are greater than a threshold value, in some embodiments. The electrical signal may have a non-linear response region for forces less than the threshold value, for example. The spring 185 may present a preloading force that is substantially equal to or greater than the threshold force. The electrical signal in response to the sum of the spring force and the tube pressure may thus be linear for all positive tube pressures, up to a maximum value.

Figure 2:
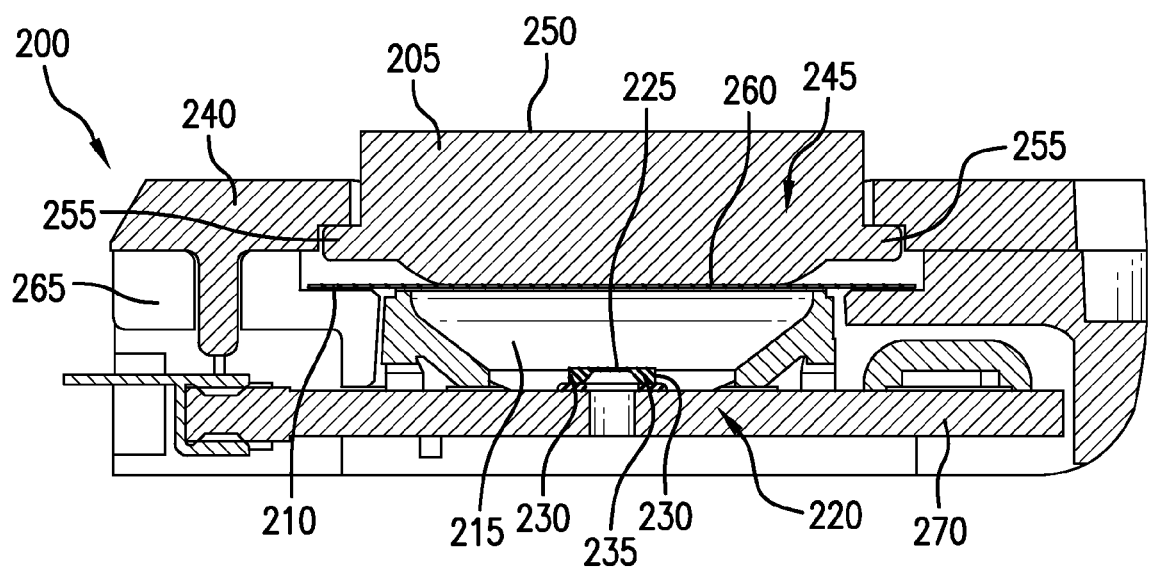
FIG. 2 depicts an exemplary preloaded force sensor.

FIG. 2 depicts an exemplary preloaded force sensor. In the FIG. 2 embodiment, an exemplary force sensor 200 includes a force-transfer button 205 in contact with a membrane 210 that captures a gel 215 within a cavity 220. The gel 215 substantially surrounds a top 225 and side 230 surfaces of a force-sensing die 235. The gel 215 may fluidly communicate an externally-applied force to the force-transfer button 205 to the force-sensing die 235. The exemplary force-transfer button 205 is depicted as being captured by a cap 240 member of the exemplary force sensor 200. The cap member 240 has an aperture 245 through which a top 250 of the force-transfer button 205 projects. The cap member 240 contains force-transfer button 205 due to a flange 255 of the force-transfer button 205 being larger than the aperture 245 of the cap member 240. The exemplary force-transfer button 205 is depicted having a gel contacting surface 260 that projects into the gel 215 when the cap member 240 captures the force-transfer button 205.

Again, a preloading force on the force-transfer button may ensure that no internal slack exists in the mechanical coupling of the sensor. In this case, the gel may have slight irregularities in its mating surface. These small irregularities may result in a non-linear measurement for small engagement forces to the force-transfer button 205. Preloading the force-transfer button so that the bottom surface of the button 205 and the top surface gel 215 are fully engaged may permit good linearity of externally-applied forces, which add to the preload force.

The gel 215 may have a temperature coefficient of expansion that is non-zero. Such a non-zero temperature coefficient of expansion may, if not compensated, result in a force measurement that varies with temperature. In some embodiments, the force-transfer button 205 may be made of a material that has a temperature coefficient of expansion of the opposite polarity as the temperature coefficient of expansion of the gel 215, for example. In some embodiments, the cap member 240 may have a temperature coefficient of expansion of the same polarity as the temperature coefficient of expansion of the gel 215. In some embodiments, the result of the combined elements having various temperature coefficients of expansion may result in a force sensor having a small temperature coefficient of expansion. In an exemplary embodiment, the combination of a cap member 240 with a positive temperature coefficient of expansion and a force-transfer button 205 with a negative coefficient of expansion, and a gel 215 having a positive temperature coefficient of expansion may result in an overall sensor response with a small or even near-zero temperature coefficient, for example.

In the FIG. 2 embodiment, the cap member 240 may be affixed to a package body 265 in a variety of ways. For example, the cap member 240 may have threads and may be screwed into the package body 265. In some embodiments, the force sensor 200 may be operably used to assist in the final assembly of the cap member 240. For example, the cap member 240 may be screwed into the package body 265 while monitoring the force being transferred to the force-sensing die 235. When the monitored force, as measured by the force-sensing die, equals or exceeds a predetermined threshold, the cap member 240 may be determined to be in its final position. In various embodiments the cap member 240 may be secured in the final position using one of a variety of means. For example, the cap member 240 may be securing to the package body 265 using an adhesive. The cap member 240 may be staked to the package body 265 in an exemplary embodiment. In some embodiments, the cap member 240 may be press fit into the package body 265. For example, projections in either the cap member 240 or the package body 265 may be pressed into complementary holes in counterpart element 265, 240. In an exemplary embodiment, the cap member 240 may be attached to the substrate 270.

Figure 3:
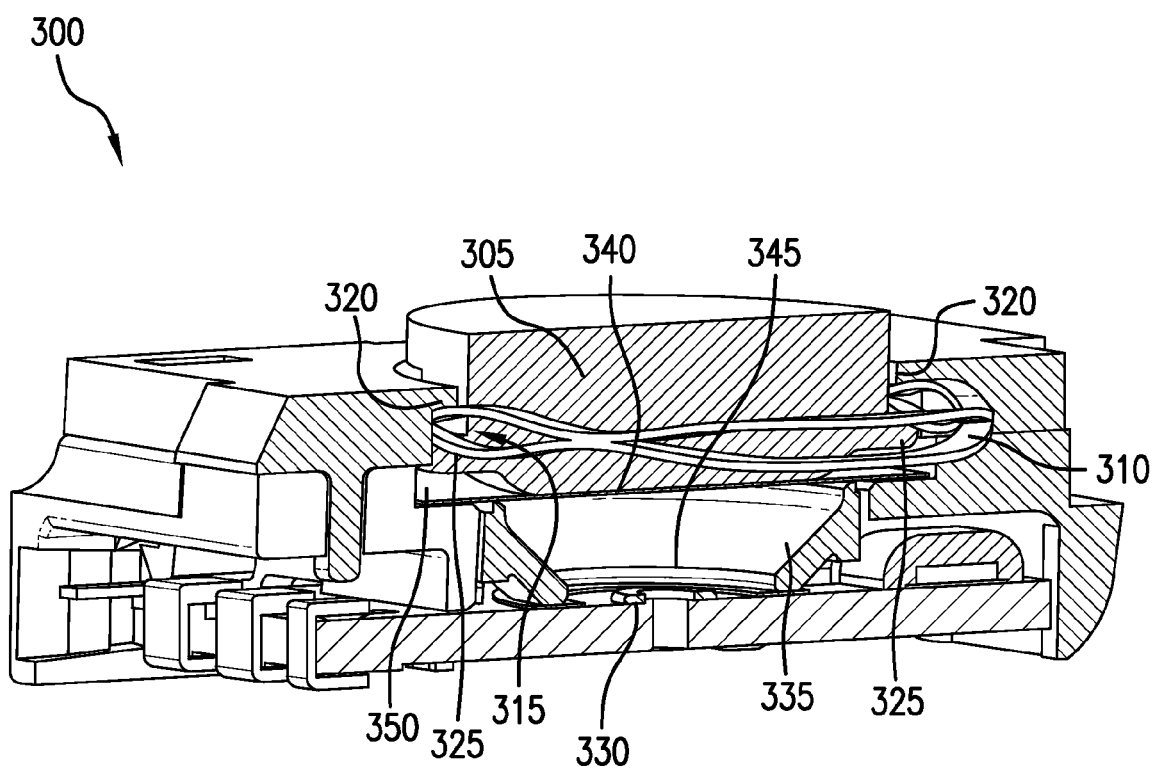
FIG. 3 depicts an exemplary force sensor with an exemplary integral force bias.

FIG. 3 depicts an exemplary force sensor with an exemplary integral force bias. In the FIG. 3 embodiment, a force sensor 300 includes a force-transfer member 305. The force-transfer member 305 has a force bias applied to it via a spring member 310. The spring member is located in an annular cavity 315 between a cap flange 320 and a force-transfer member flange 325. The applied force bias is directed toward a force-sensing die 330. The applied force bias is fluidly communicated to the force-sensing die 330 via a gel 335. The gel 335 is in fluid communication between a bottom surface 340 of the force-transfer member 305 and the top surface 345 of the force-sensing die 330. In some embodiments, an interface membrane 350 is positioned between the bottom surface 340 of the force-transfer member 305 and the gel 335.

In various embodiments, various means for providing a force bias may be implemented. In some embodiments, a force bias may result from a spring member. In some embodiments, the spring member may be made of plastic. In some embodiments the spring member may be made of metal. In an exemplary embodiment, the spring member may be made of steel. In another exemplary embodiment the spring member may be made of copper, for example. In one exemplary embodiment, the spring member may be made of aluminum. In some embodiments a spring member may compressively direct a force toward the force-sensing die 330. In some embodiments, a spring member may use a tensile force to direct a preload force toward the force-sensing die 330.

Figure 4:
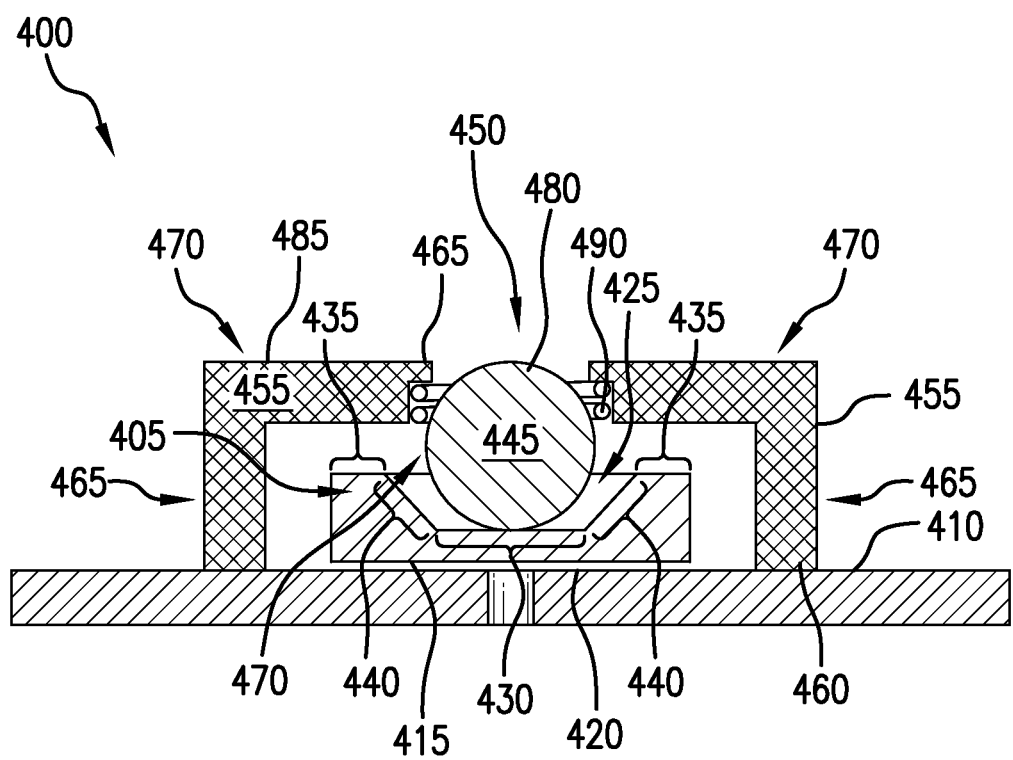
FIG. 4 depicts an exemplary integrally-biased force sensor having an exemplary force-transfer member.

FIG. 4 depicts an exemplary integrally-biased force sensor having an exemplary force-transfer member. In the FIG. 4 embodiment, a force sensor 400 includes a force-sensing die 405 on a package substrate 410. The force-sensing die 405 has a processed sensor surface 415 facing a top surface 420 of the package substrate 410. The force-sensing die 405 also has a back surface 425 that has a thinned region 430 and a thick region 435. Between the thinned region 430 and the thick region 435 is a sidewall region 440. A force-coupling member 445 projects through an aperture 450 in a sensor containment housing 455. The force-coupling member 445 depicted in this embodiment is substantially spherical. The sensor containment housing 455 is attached to the package substrate 410 at a base 460 of sidewalls 465 of the sensor containment housing 455. The sensor containment housing 455 has a containment flange 465 projecting radially inward from a ceiling 470 of the sensor containment housing 455. The projecting flange 465 locally reduces the size of the aperture 450 of the sensor containment housing 455. The reduced aperture size may be smaller than a diameter of the force-coupling member 445 which may result in retention of the force-coupling member 445 within an internal cavity 475 of the force sensor 400. A projecting surface 480 of the force-coupling member 445 may project above a top surface 485 of the ceiling 470 of the sensor containment housing 455. The force-coupling member 445 may be directed toward the force-sensing die 405 by a preloading device 490. In some embodiments, the preloading device 490 may be a coil spring, for example. In some embodiments, the preloading device 490 may be a wave spring. In some embodiments a flat spring may preload the force-sensing die 405, for example.

Figure 5:
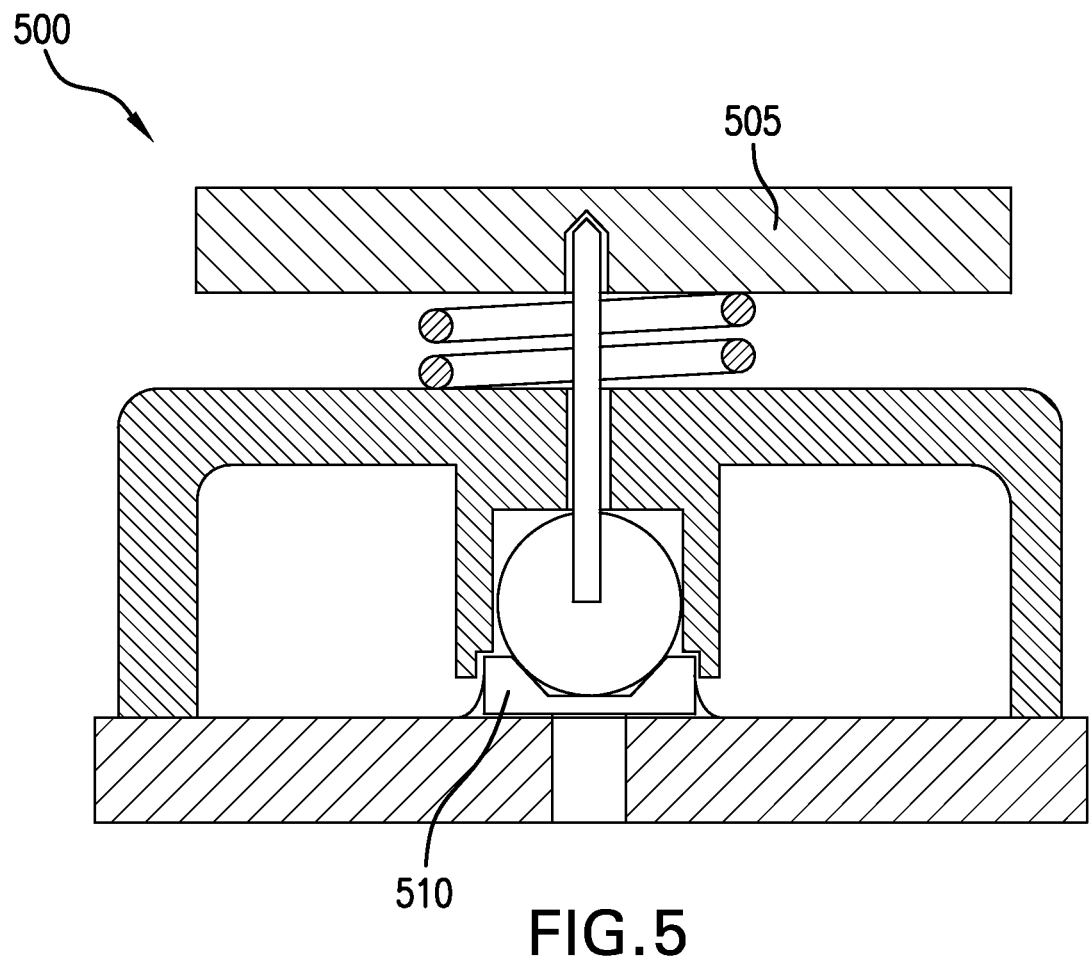
FIG. 5 depicts an exemplary preloaded force sensor having a plunger-type force-transfer member.

FIG. 5 depicts an exemplary preloaded force sensor having a plunger-type force-transfer member. In the FIG. 5 embodiment, an exemplary force sensor 500 includes a plunger-type of force-coupling member 505. The plunger 505 has a preloading force directing the plunger 505 toward a force-sensing die 510. The preloading force results from a preloading spring member 515 in a tensile or stretched condition. In some embodiments, a magnetic field may be used to perform the preloading. In an exemplary embodiment, a static electric field may create the preloading force. In some examples, the static electric field can be programmably set by a preload generating circuit. In an exemplary embodiment, the preload generating circuit may receive a measurement signal from a force-sensing die 510 and use the received measurement signal to determine a desired preload force, for example.

Figure 6:
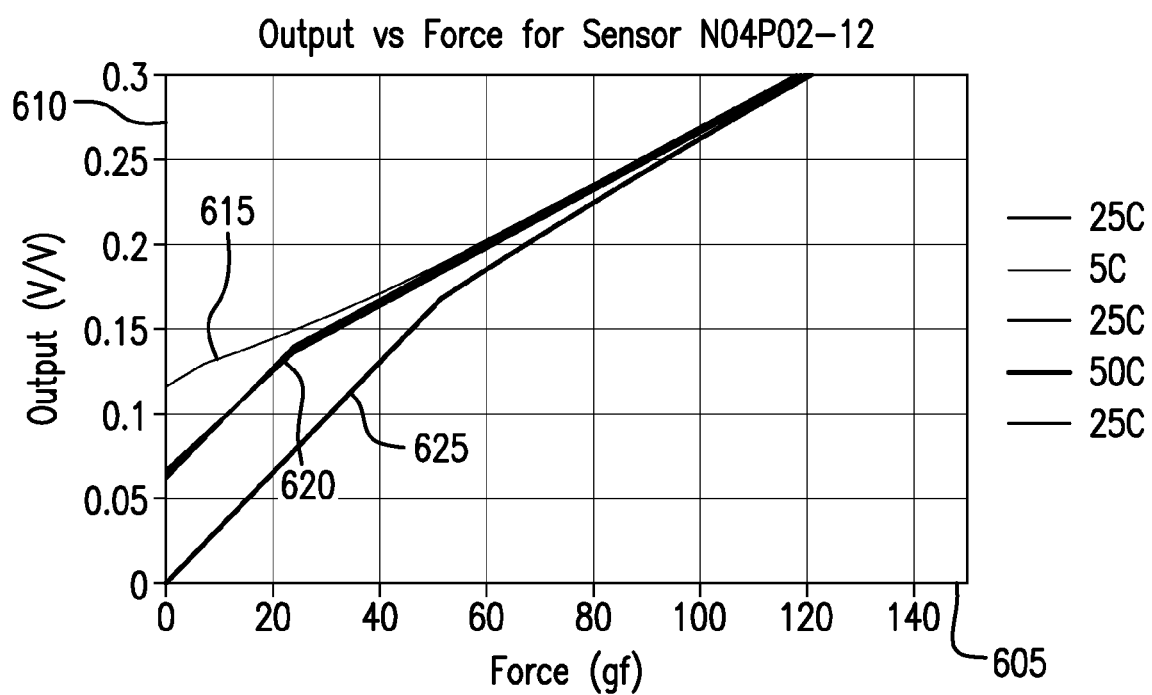
FIG. 6 depicts an exemplary electrical response to an applied force.

FIG. 6 depicts an exemplary electrical response to an applied force. In FIG. 6 a graph 600 has a horizontal axis 605 that represents an applied force to a force sensor that has no preloading. The graph 600 has a vertical axis 610 the represents an output signal of the force sensor. Three relations are depicted on the graph 600. A 5° C. relation 615 depicts the signal response to an applied force when the force sensor is at 5° C. ambient temperature. A 25° C. relation 620 depicts the signal response to an applied force when the force sensor is at 25° C. ambient temperature. A 50° C. relation 625 depicts the signal response to an applied force when the force sensor is at 50° C. ambient temperature. At high values of applied force (e.g. forces greater than 60 gf), all three relations 615, 620, 625 are very similar and nearly linear. But at low values of applied force (e.g. forces less than 40 gf) the three relations separate one from another. The force sensor responds differently at different temperatures to low values of applied force.

In some embodiments, the force sensor response to small forces may be non-linear. In some embodiments, the force sensor response to small forces may be non-linear.

Figure 7:
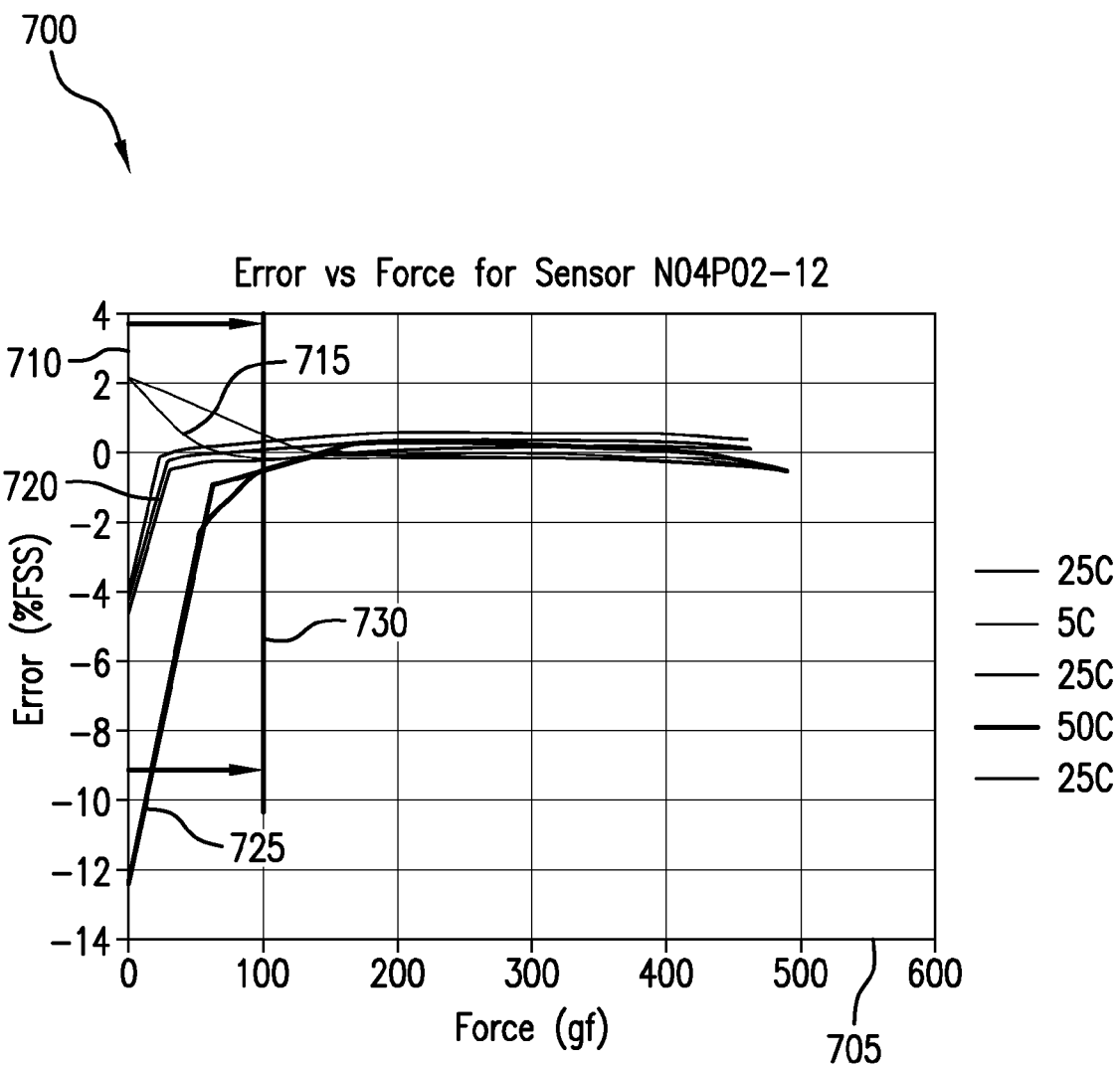
FIG. 7 depicts an exemplary relative error signal to an applied force.

FIG. 7 depicts an exemplary relative error signal to an applied force. In the FIG. 7 depiction, a graph 700 of the error in the response signal of a force sensor is plotted versus the applied force. Again, the horizontal axis 705 represents the applied force, but the scale is different than that of the horizontal axis 605 of FIG. 6 . . . . The vertical axis 710 represents the error in the response signal of a force sensor having no force bias. The response error relation to the applied force is plotted for three different ambient temperatures. A 5° C. relation 715 depicts the response error to an applied force when the force sensor is at 5° C. ambient temperature. A 25° C. relation 720 depicts the response error to an applied force when the force sensor is at 25° C. ambient temperature. A 50° C. relation 725 depicts the response error to an applied force when the force sensor is at 50° C. ambient temperature. Note that the response error for all three ambient temperatures is very small for applied forces larger than 100 gf. Also note that the response errors for all three ambient temperatures become relatively large for small values of applied force. If a force bias of 100 gf were applied to the force sensor whose response is depicted, a coordinate transformation would shift the vertical axis to a new zero position 730 (representing only the externally-applied portion of the total force). Externally-applied forces will then be added to the force bias, and the response error will be small.

Although various embodiments have been described with reference to the Figures, other embodiments are possible. For example, various embodiments may include signal conditioning circuit. In some embodiments, the signal conditioning circuit may be attached to a bottom side of a package substrate. In some embodiments, the force sensing die may have a mechanical contact interface. An example of such a mechanical contact interface is described and depicted, for example, with reference to at least FIG. 3 in U.S. patent application Ser. No. 13/429,280 titled "Force Sensor," filed on Mar. 23, 2012, the entire disclosure of which is herein incorporated by reference. In some embodiments, the force transfer device may have spherical configuration. Various examples of such a force transfer device are described and depicted, for example, with reference to at least FIGS. 1-2 in U.S. patent application Ser. No. 13/628,673 titled "Mechanically Coupled Force Sensor on Flexible Platform Assembly Structure," filed on Sep. 27, 2012, the entire disclosure of which is herein incorporated by reference.

In an illustrative embodiment, a force-sensing device includes a force measurement system including a piezo-resistive force sensor that generates an electrical signal in response to a force directed toward a bottom interface of the piezo-resistive force sensor. In some embodiments, the force measurement system includes a force-transfer member that directs a force toward the bottom interface of the piezo-resistive force sensor in response to an externally-applied force directed toward an external surface of the force-transfer member. In some embodiments the force measurement system includes a pre-load force applicator directing a predetermined force toward the bottom interface of the piezo-resistive force sensor, the predetermined force adding to the applied force to create a total applied force directed toward the bottom interface of the piezo-resistive force sensor. In an exemplary embodiment, the force-sensing die generates an electrical signal in response to a total applied force, substantially linearly when the total applied force is greater than the predetermined force and less than a maximum applied force. In some embodiments, the electrical signal responds to a total applied force non-linearly over an applied force range between zero and the predetermined force.

In an illustrative embodiment, a force-sensing device includes a package substrate having a plurality of die connecting pads on a top surface. In some embodiments, the force-sensing device includes a piezo-resistive force-sensing die having a thinned central region and a plurality of electrical interconnects each electrically connected to one of the plurality of connecting pads on the top surface of the package substrate. In some embodiments, a force-sensing device includes a force-transfer member in mechanical contact with the thinned central region of the force-sensing die, wherein the thinned central region of the force-sensing die may elastically deflect toward the top surface of the substrate in response to an applied force directed through the force-transfer member and toward the force-sensing die. In an exemplary embodiment, the force-sensing die may generate an electrical signal in response to the applied force directed through the force-transfer member and toward the force-sensing die. In some examples, the responsive electrical signal may have a substantially-linear region and a non-linear region, wherein the responsive electrical signal is in the substantially-linear region when the applied force is greater than or equal to a demarking force, and the responsive signal is in the non-linear region when the applied force is less than the demarking force. In some embodiments, the force-sensing device includes a force applicator that may apply a predetermined force directed toward the force-sensing die. In an exemplary embodiment, the predetermined force may be greater than or approximately equal to the demarking force.

In an illustrative embodiment, a force-measurement system includes a force sensor having a central region. In some embodiments, the force-measurement system may include a force-coupling member in mechanical contact with the central region of the force sensor, wherein the central region of the force sensor deflects in response to a force applied to the force-transfer member and directed toward the force sensor. In some embodiments the force-measurement system may include a preload-force applicator that directs a predetermined preload-force toward the central region of the force sensor. In some examples, the predetermined preload-force may add to an externally-applied force to create a total applied force directed toward the piezo-resistive force sensor. In various embodiments, the electrical signal may respond to an externally-applied force substantially linearly when the externally-applied force is greater than zero and less than a maximum externally-applied force. In an exemplary embodiment, the electrical signal may respond to a total applied force non-linearly over a total applied force range between zero and the predetermined preload-force.

In an illustrative embodiment, means for applying a predetermined preload-force directed toward the central region of the force sensor may include a spring. In some embodiments, the spring may apply a force upon a force-transfer member, which may be directed toward the central region. In some examples, means for applying a predetermined force may include retaining a preloading member by a housing, the retention providing a force directed toward the central region. In some embodiment, fluid pressure of a gel may apply a preload force to the central region, for example.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A force-sensing device comprising:
   a package substrate having a plurality of die connecting pads on a top surface,
   a piezo-resistive force-sensing die having a thinned central region and a plurality of electrical interconnects each electrically connected to one of the plurality of connecting pads on the top surface of the package substrate;
   a force-transfer member in mechanical contact with the thinned central region of the force-sensing die, wherein the thinned central region of the force-sensing die elastically deflects toward the top surface of the package substrate in response to an applied force directed through the force-transfer member and toward the force-sensing die, wherein the force-sensing die generates an electrical signal in response to the applied force directed through the force-transfer member and toward the force-sensing die, the responsive electrical signal having a substantially-linear region and a non-linear region, wherein the responsive electrical signal is in the substantially-linear region when the applied force is greater than or equal to a demarking force, and the responsive signal is in the non-linear region when the applied force is less than the demarking force; and,
   a force applicator applying a predetermined force directed toward the force-sensing die, the predetermined force being greater than or approximately equal to the demarking force.

2. The force-sensing device of claim 1, further comprising a housing mechanically coupled to the package substrate, the housing having an aperture, through which an external portion of the force-transfer member projects, the housing and package substrate combining to create a cavity in which the force-sensing die, an internal portion of the force-transfer member and the force applicator reside.

3. The force-sensing device of claim 1, wherein the force applicator comprises a spring.

4. The force-sensing device of claim 1, wherein the force transfer member comprises a gel.

5. The force-sensing device of claim 1, wherein the predetermined force is approximately equal to the demarking force.

6. A force-measurement system comprising:
   a force sensor having a central region;
   a force-coupling member in mechanical contact with the central region of the force sensor, wherein the central region of the force sensor deflects in response to a force applied to the force-transfer member and directed toward the force sensor; and,
   a preload-force applicator that directs a predetermined preload-force toward the central region of the force sensor, the predetermined preload-force adding to an externally-applied force to create a total applied force directed toward the force sensor,
   wherein the electrical signal responds to an externally-applied force substantially linearly when the externally-applied force is greater than zero and less than a maximum externally-applied force,
   wherein the electrical signal responds to a total applied force non-linearly over a total applied force range between zero and the predetermined preload-force.

7. The force-sensing device of claim 6, wherein the force sensor comprises a piezo-resistive force sensing die.

8. The force-sensing device of claim 6, further comprising a signal conditioning circuit.

9. The force-sensing device of claim 6, further comprising a housing, the housing having an aperture, through which an external portion of the force-coupling member projects.

10. The force-sensing device of claim 6, wherein the force-coupling member comprises a ball bearing.

11. The force-sensing device of claim 6, wherein the force-coupling member comprises a gel.

12. The force-sensing device of claim 6, wherein the pre-load-force applicator comprises a spring.

13. The force-sensing device of claim 9, wherein the pre-load-force applicator comprises a loading portion of the housing.

14. The force-sensing device of claim 6, wherein a maximum magnitude of deviation of the electrical signal response to the externally-applied force is less than 0.5% different than that of a straight-line fit between the electrical signal and the externally-applied force over a specified operating force range.

15. The force-sensing device of claim 6, wherein a maximum deviation of the electrical signal response to a linear fit of the electrical signal response to the externally-applied force is between −0.5% and 0.5% of the electrical signal response to a specified full-scale externally-applied force.

16. A force-measurement system comprising:
   a force sensor having a central region;
   a force-coupling member in mechanical contact with the central region of the force sensor, wherein the central region of the force sensor deflects in response to a force applied to the force-transfer member and directed toward the force sensor; and,
   means for applying a predetermined preload-force directed toward the central region of the force sensor, the predetermined pre-load force adding to an externally-applied force to create a total applied force directed toward the force sensor,
   wherein the electrical signal responds to an externally-applied force substantially linearly when the externally-applied force is greater than zero and less than a maximum externally-applied force,
   wherein the electrical signal responds to a total applied force non-linearly over a total applied force range between zero and the predetermined preload-force.

17. The force-sensing device of claim 16, wherein the means for applying a predetermined preload-force comprises means for directing a spring force.

18. The force-sensing device of claim 16, wherein a ratio of the predetermined preload-force to the maximum externally-applied force is between 5% and 30% of the total applied force.

19. The force-sensing device of claim 16, wherein a maximum magnitude of deviation of the electrical signal response to the externally-applied force is less than 0.5% different than that of a straight-line fit between the electrical signal and the externally-applied force over a specified operating force range.

20. The force-sensing device of claim 16, wherein a maximum deviation of the electrical signal response to a linear fit of the electrical signal response to the externally-applied force is between −0.5% and 0.5% of the electrical signal response to a specified full-scale externally-applied force.

* * * * *